United States Patent
Jung et al.

(10) Patent No.: US 10,121,253 B2
(45) Date of Patent: Nov. 6, 2018

(54) METHOD AND APPARATUS FOR MODELING TARGET OBJECT TO REPRESENT SMOOTH SILHOUETTE

(71) Applicant: Samsung Electronics Co., Ltd., Suwon-si (KR)

(72) Inventors: Hwiryong Jung, Seoul (KR); Nahyup Kang, Seoul (KR); Jiyeon Kim, Hwaseong-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 14/879,273

(22) Filed: Oct. 9, 2015

(65) Prior Publication Data
US 2016/0104319 A1    Apr. 14, 2016

(30) Foreign Application Priority Data
Oct. 13, 2014    (KR) .................. 10-2014-0137655

(51) Int. Cl.
| G06T 5/00 | (2006.01) |
| G06T 7/00 | (2017.01) |
| G06T 13/60 | (2011.01) |
| G06T 17/10 | (2006.01) |
| G06T 7/529 | (2017.01) |
| G06T 7/12 | (2017.01) |

(52) U.S. Cl.
CPC ............ *G06T 7/0089* (2013.01); *G06T 5/002* (2013.01); *G06T 7/12* (2017.01); *G06T 7/529* (2017.01); *G06T 2207/20028* (2013.01)

(58) Field of Classification Search
CPC ....... G06F 9/44; H04L 41/0893; H04L 43/04; Y02B 60/185; G06T 2207/20028; G06T 5/002; G06T 7/0089; G06T 7/12; G06T 7/529
See application file for complete search history.

(56) References Cited

U.S. PATENT DOCUMENTS

| 6,181,838 B1 * | 1/2001 | Knowlton ......... G06F 17/30873 382/305 |
| 8,947,430 B1 * | 2/2015 | Green .................... G06T 13/20 345/426 |
| 2003/0016218 A1 | 1/2003 | Zwicker et al. |

FOREIGN PATENT DOCUMENTS

| JP | 2001-13952 A | 1/2001 |
| JP | 2007-506167 A | 3/2007 |
| KR | 2003-007985 A | 10/2003 |

(Continued)

OTHER PUBLICATIONS

Matthias Muller, Simon Schirm, Matthias Teschner, Bruno Heidelberger and Markus Gross, "Interaction of Fluids with Deformable Solids," Computer Animation and Virtual Worlds, Jul. 2004 vol. 15, Issue 3-4, pp. 159-171.*

(Continued)

*Primary Examiner* — Sing-Wai Wu
(74) *Attorney, Agent, or Firm* — NSIP Law

(57) ABSTRACT

Provided is a method of modeling a target object, that may obtain depth information from an image in which the target object is represented in a form of particles, obtain distance information between adjacent particles in the image, and detect a silhouette of the target object based on the depth information and the distance information between the adjacent particles in the image.

24 Claims, 9 Drawing Sheets

(56) References Cited

FOREIGN PATENT DOCUMENTS

KR   10-2005-0069917 A   7/2005
KR   10-2007-0119018 A   12/2007

OTHER PUBLICATIONS

Van der Laan, W. et al., "Screen Space Fluid Rendering with Curvature Flow," Proceedings of the 2009 symposium on Interactive 3D graphics and games, ACM, 2009 (20 pages).
Green, S., "Screen space fluid rendering for games," Proceedings for the Game Developers Conference held in San Francisco, CA on Mar. 9-13, 2010 (75 pages).
Saputra, R., "Kinect Depth Map Filtering and Post-Processing," International Games System Inter Report, 2012 (20 pages).

* cited by examiner

310

900

METHOD AND APPARATUS FOR MODELING TARGET OBJECT TO REPRESENT SMOOTH SILHOUETTE

CROSS-REFERENCE TO RELATED APPLICATION(S)

This application claims the benefit under 35 USC 119(a) of Korean Patent Application No. 10-2014-0137655, filed on Oct. 13, 2014, in the Korean Intellectual Property Office, the entire disclosure of which is incorporated herein by reference for all purposes.

BACKGROUND

1. Field

The following description relates to a method and apparatus for modeling a target object to represent a smooth silhouette.

2. Description of Related Art

With respect to a fluid simulation in a computer graphics (CG) area, in particular, in a visual effects (VFX) area, a research for digitizing a fluid movement is still in progress.

The fluid may be represented in a form of very small particles. In general, the particles are represented in a spherical shape to visualize the fluid based on the particles. Therefore, a boundary line and the like of the visualized fluid may be represented unnaturally.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of modeling a target object, the method including obtaining depth information from an image in which the target object is represented in a form of particles, obtaining distance information between adjacent particles in the image, and detecting a silhouette of the target object based on the depth information and the distance information.

The detecting of the silhouette may include determining whether the distance information between the adjacent particles in the image is greater than or equal to a threshold, and detecting the silhouette of the target object based on the depth information, when the distance information between the adjacent particles in the image is determined to be less than the threshold.

The detecting of the silhouette may include determining whether the distance information between the adjacent particles in the image is greater than or equal to a threshold, and detecting the silhouette of the target object based on the depth information and the distance information, when the distance information between the adjacent particles in the image is determined to be greater than or equal to the threshold.

The threshold may be two times greater than a radius of a particle.

The detecting of the silhouette may include detecting the silhouette of the target object based on the depth information, and correcting the detected silhouette based on the distance information.

The obtaining of the distance information between the adjacent particles in the image may include defining a target area used to obtain the distance information between the adjacent particles in the image, based on the depth information, and obtaining the distance information between the adjacent particles comprised in the target area.

The defining of the target area may include defining the target area based on a difference in the depth information between the adjacent particles in the image.

The obtaining of the depth information may include visualizing the particles in a form of a circle or oval using sprite (scheme), and computing the depth information based on the visualized particles.

The visualizing of the particles may include visualizing the particles by computing a movement of the target object.

The performing smoothing on an adjacent area may include the silhouette of the target object in the image.

The performing of the smoothing on the adjacent area may include performing smoothing on the adjacent area using a bilateral filter.

The target object may include one of a fluid and a deformable body.

A non-transitory computer-readable storage medium including a program having instructions to cause a computer to perform the method of modeling a target object.

In another general aspect, there is provided an apparatus for modeling a target object, the apparatus including a memory configured to record a program to control an operation of the apparatus for modeling the target object, and a processor configured to execute the program. The program may be configured to obtain depth information from an image in which the target object is represented in a form of particles, to obtain distance information between adjacent particles in the image, and to detect a silhouette of the target object based on the depth information and the distance information.

The program may be further configured to determine whether the distance information between the adjacent particles in the image is greater than or equal to a threshold, to detect the silhouette of the target object based on the depth information when the distance information between the adjacent particles in the image is determined to be less than the threshold, and to detect the silhouette of the target object based on the depth information and the distance information between the adjacent particles in the image when the distance information is determined to be greater than or equal to the threshold.

The program may be further configured to detect the silhouette of the target object based on the depth information, and to correct the detected silhouette based on the distance information between the adjacent particles in the image.

The threshold may be two times greater than a radius of a particle.

The program may be further configured to define a target area used to obtain the distance information from the image, based on the depth information, and to obtain the distance information between the adjacent particles comprised in the target area.

The program may be further configured to define the target area based on a difference in the depth information between the adjacent particles in the image.

The program may be further configured to perform smoothing on an adjacent area comprising the silhouette of the target object in the image.

Other features and aspects will be apparent from the following detailed description, the drawings, and the claims.

Figure 1:
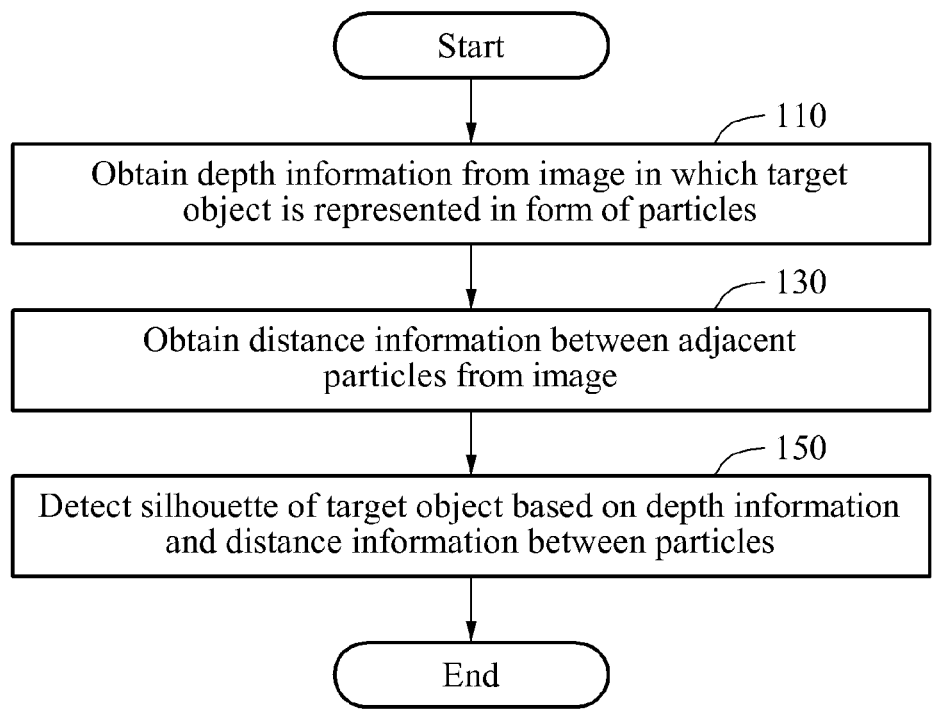
FIG. 1 is a flowchart illustrating an example of a method of modeling a target object according to example embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, the examples will be described with reference to the accompanying drawings. Like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates an example of a method of modeling a target object according to example embodiments;

Referring to FIG. 1, in operation 110, an apparatus for modeling a target object (hereinafter, a "modeling apparatus") obtains depth information from an image in which the target object is represented in a form of particles. In operation 110, the modeling apparatus visualizes the particles by computing a movement of the target object, and computing the depth information based on the visualized particles. The depth information, for example, is provided in a form of a depth map.

In operation 130, the modeling apparatus obtains distance information between adjacent particles in the image.

In operation 130, the modeling apparatus defines a target area used to obtain the distance information on the distance between the particles in the image, based on the depth information, and obtains the distance information on the distance between the adjacent particles included in the target area. Distance information between adjacent particles obtained according to example embodiments will be described with reference to FIG. 6.

In operation 150, the modeling apparatus detects a silhouette of the target object based on the depth information obtained in operation 110 and the distance information obtained in operation 130. In accordance with one configuration, the silhouette of the target object or a ridge of the target object is generated when a difference in depth information is relatively large. In operation 150, to more accurately detect the silhouette of the target object generated when the difference in depth information is relatively large, the modeling apparatus determines whether the distance information on the distance between the particles is greater than or equal to a predetermined threshold, and detects the silhouette of the target object based on a result of the determination. The predetermined threshold may be two times, for example, 2r, greater than a radius of a particle.

Figure 5:
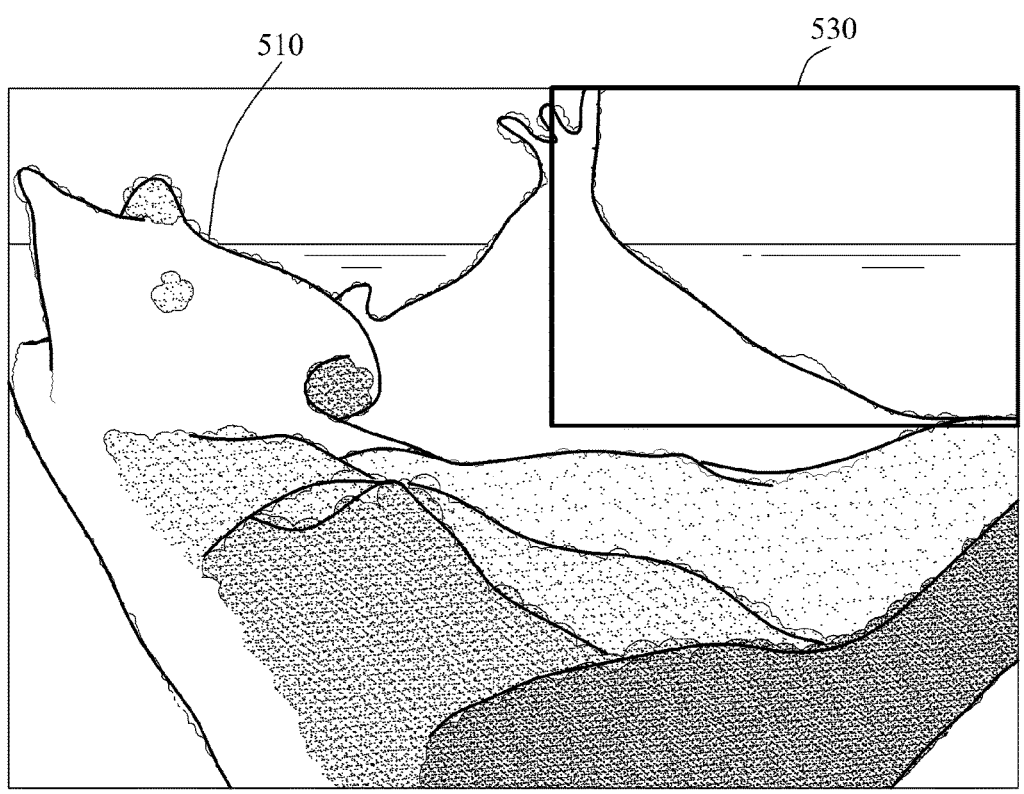
FIG. 5 illustrates an example of a detected silhouette in a method of modeling a target object according to example embodiments.

Referring to FIG. 5, the detected silhouette includes a boundary line portion between a fluid, for example, seawater, and a background, and a portion in which the fluid rises and forms a shape of a ridge. A method of detecting a silhouette of a target object by a modeling apparatus will be described with reference to FIG. 6.

According to example embodiments, the modeling apparatus detects a silhouette of a target object based on depth information, and corrects the detected silhouette based on distance information between adjacent particles in an image. For example, the modeling apparatus searches for the silhouette based on a depth map, and corrects the silhouette to be represented more naturally based on distance information between particles based on sizes of the particles.

Figure 2:
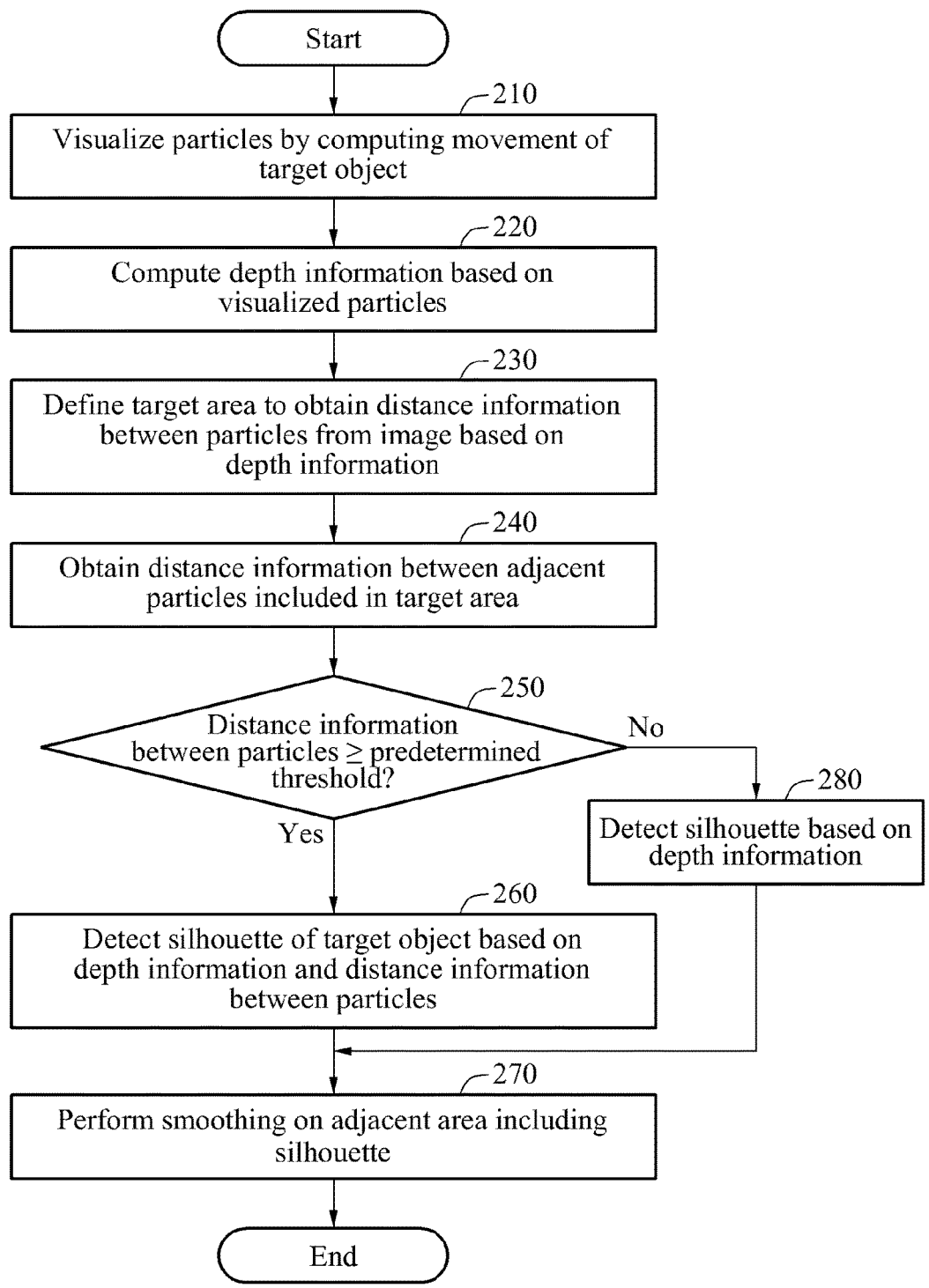
FIG. 2 is a flowchart illustrating another example of a method of modeling a target object according to example embodiments.

FIG. 2 illustrates another example of a method of modeling a target object according to example embodiments.

Figure 3:
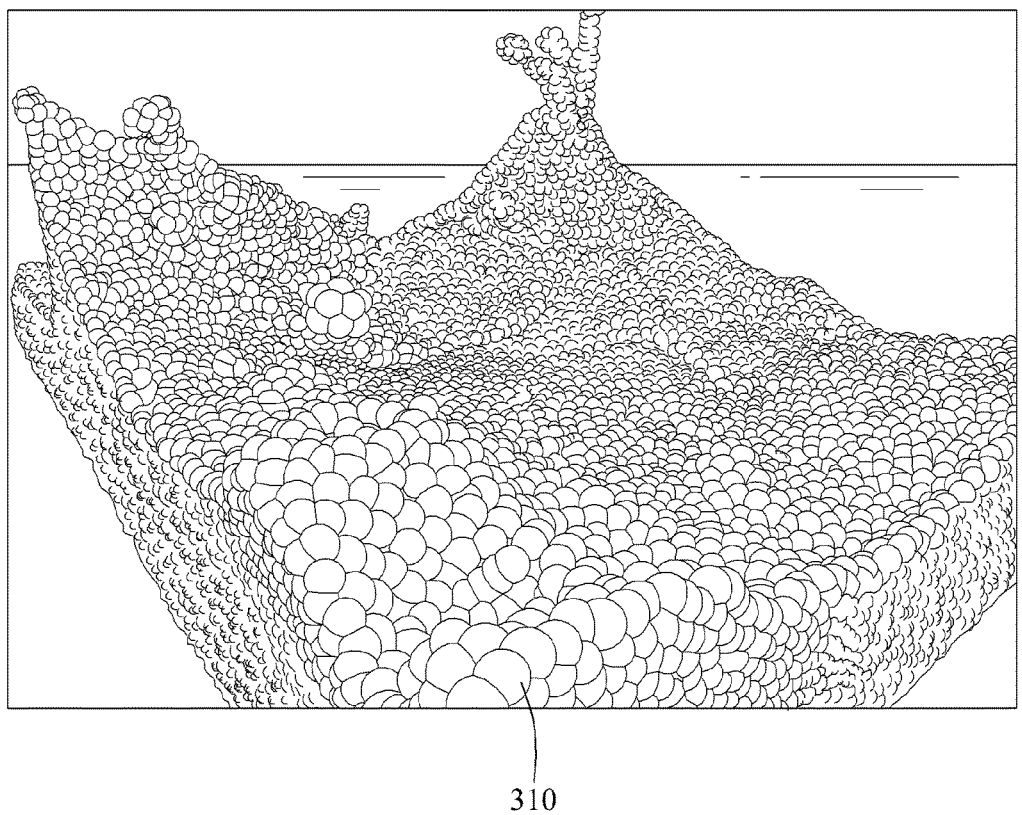
FIG. 3 illustrates an example of a visualization of a target object in a form of particles in a method of modeling a target object according to example embodiments.

Referring to FIG. 2, in operation 210, a modeling apparatus according to example embodiments visualizes particles by computing a movement of the target object. The modeling apparatus, for example, represents the target object in a form of particles as illustrated in FIG. 3.

Figure 4:
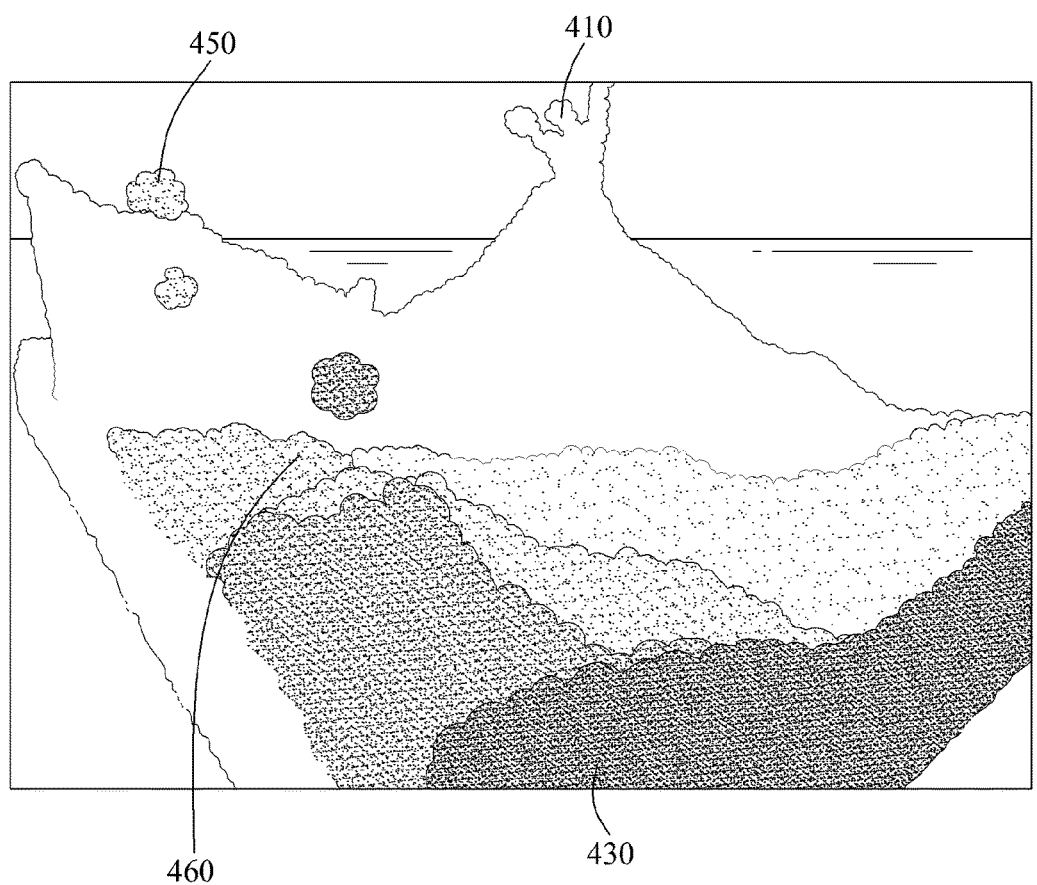
FIG. 4 illustrates an example of depth information obtained based on visualized particles in a method of modeling a target object according to example embodiments.

In operation 220, the modeling apparatus computes depth information based on the visualized particles. The target object may be a fluid, a deformable body, or a form in which the fluid and the deformable body are combined. The depth information, for example, may be provided in a form of a depth map as illustrated in FIG. 4.

In operation 230, the modeling apparatus defines a target area used to obtain distance information between the particles in an image, based on the depth information computed in operation 220.

In lieu of computing distance information between adjacent particles with respect to all particles, the modeling apparatus may approximately select the target area primarily based on the depth information prior to computing the distance information on the distance between the particles, and obtain the distance information on the distance between the particles from the target area.

According to example embodiments, the modeling apparatus may define a target area based on a difference in depth information between adjacent particles in an image. The modeling apparatus may define an area in which a brightness difference is relatively large, for example, an area in which the difference in the depth information between the particles is greater than or equal to 0.5, in a depth map of the image, as the target area used to obtain the distance information on the distance between the adjacent particles.

In operation 240, the modeling apparatus obtains the distance information on the distance between the adjacent particles included in the target area defined in operation 230. In operation 250, the modeling apparatus determines whether the distance information on the distance between the particles obtained in operation 240 is greater than or equal to a threshold.

In operation 260, when the distance information on the distance between the obtained particles is determined to be greater than or equal to the threshold in operation 250, the modeling apparatus detects a silhouette of the target object based on the depth information and the distance information on the distance between the particles. The modeling apparatus, for example, may detect the silhouette as illustrated in FIG. 5.

In operation 270, the modeling apparatus performs smoothing on an adjacent area including the silhouette in the image. The modeling apparatus may perform smoothing on the adjacent area including the silhouette using, for example, a bilateral filter. The bilateral filter is one of conventional filters to be used for performing smoothing on an image area. A concept of the bilateral filter is based on the concept in which two pixels are adjacent to each other in a spatial area and have similar adjacent values.

The modeling apparatus may distinctly represent a boundary and smoothly represent the silhouette, a ridge, and the like, by performing a filtering on depth information in the adjacent area including the silhouette.

When the distance information on the distance between the particles is determined not to be greater than or equal to the threshold in operation 250, the modeling apparatus detects the silhouette of the target object only based on the depth information in operation 280, and does not perform smoothing on an outside area except the adjacent area including the detected silhouette.

FIG. 3 illustrates an example of a visualization of a target object in a form of particles in a method of modeling a target object according to example embodiments.

FIG. 3 illustrates an image in which the target object, for example, rough seas is represented using particles 310 in a spherical shape.

A modeling apparatus according to example embodiments may visualize the particles 310, corresponding to a fluid, forming the sea, such as a circle or an oval using sprite (scheme), by computing a movement of the sea corresponding to the fluid. In computer graphics, a sprite is a two-dimensional image or animation that is integrated into a larger scene. Initially including just graphical objects handled separately from the memory bitmap of a video display, this now includes various manners of graphical overlays. Near particles, relative to the eyes of the user, seem to be relatively bigger and distant particles, relative to the eyes of the user, seem to be relatively smaller, according to a distance between the particles and the eyes of the user. However, sizes of the particles 310 are identical irrespective of the distance between the particles and the eyes of the user.

FIG. 4 illustrates an example of depth information obtained based on visualized particles in a method of modeling a target object according to example embodiments.

FIG. 4 illustrates a depth map obtained from an image in which the target object is represented in a form of particles.

In the depth map, each particle is represented by varying degrees of contrast ranging from white to black.

In the depth map, a portion 410 represented in white corresponds to distant particles, relative to eyes of a user, and a portion 430 represented in black corresponds to near particles, relative to the eyes of the user. As colors of particles represented in the depth map are changed from black to white, the distance between the particles and the eyes of the user increases.

For example, when depth information on particles represented in white in the depth map is '1', depth information on particles represented in black may be '0'.

According to example embodiments, a target object is configured in a form of particles. Accordingly, when a depth map of an image is generated, a boundary line portion 450 between the fluid and the background, a ridge portion 460 in which the fluid rises and forms a shape of a ridge, and the like may be ruggedly represented.

FIG. 5 illustrates an example of a detected silhouette in a method of modeling a target object according to example embodiments.

Referring to FIG. 5, the detected silhouette is represented as a bold line 510. Also, an area corresponding to the boundary line portion 450 between the fluid and the background and the ridge portion 460 of FIG. 4 are smoothly represented in FIG. 5. A method of smoothly representing a silhouette in an image in which a target object is represented in a form of particles according to example embodiments will be described with reference to FIG. 6.

Figure 6:
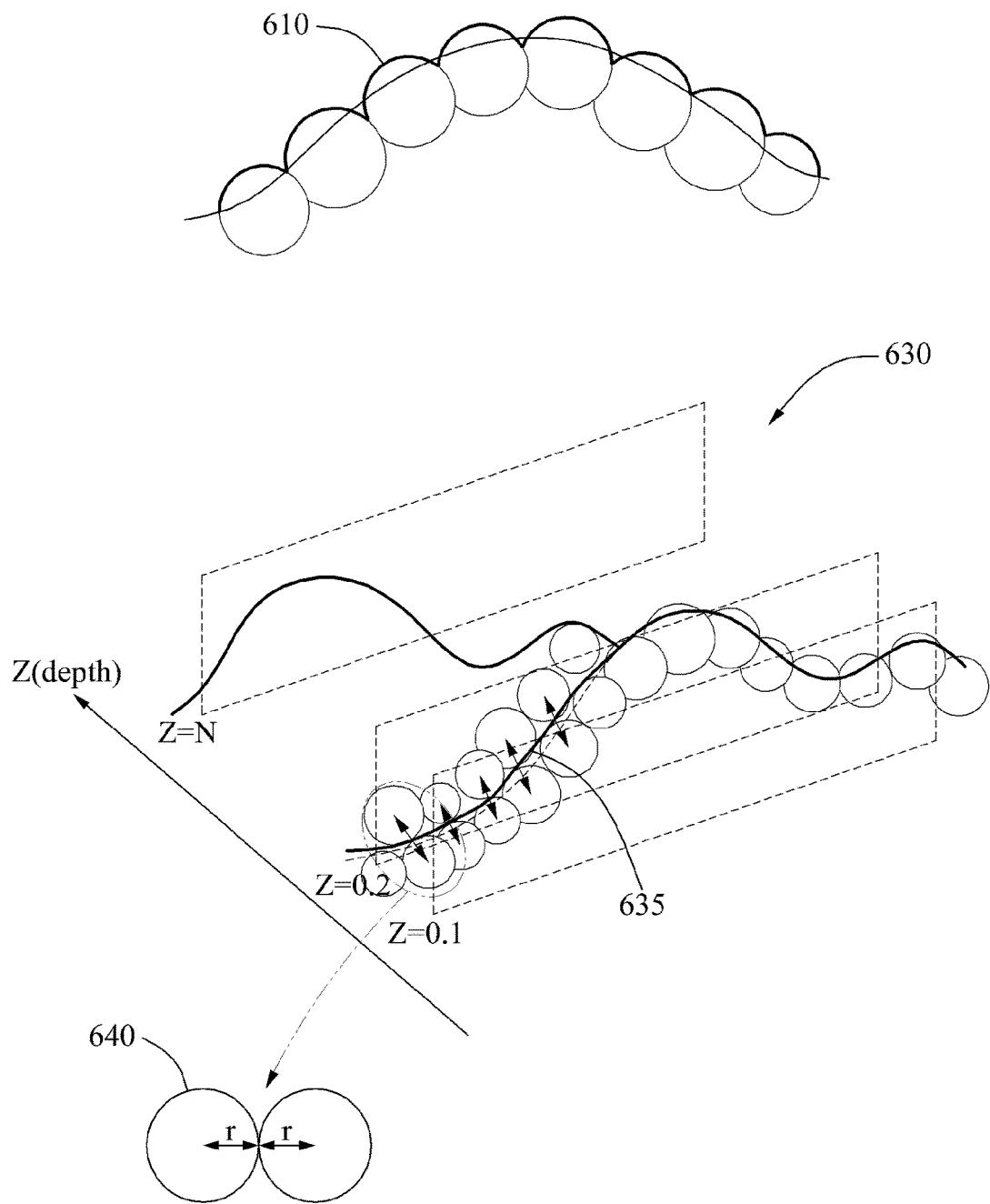
FIG. 6 illustrates an example of detecting a silhouette of a target object in a method of modeling a target object according to example embodiments.

FIG. 6 illustrates an example of detecting a silhouette of a target object in a method of modeling a target object according to example embodiments.

FIG. 6 illustrates a silhouette 610 of the target object detected based on depth information and a silhouette 635 of the target object detected based on the depth information and distance information.

As described above, shapes of particles included in a depth map obtained from the image in which the target object is represented are shown on a boundary line portion or a ridge portion, and thus, may be ruggedly represented as the silhouette 610.

According to example embodiments, a silhouette may be smoothly represented based on distance information between adjacent particles and depth information.

When the distance information between the particles is less than a threshold, the modeling apparatus does not perform smoothing by determining that the corresponding particles are not particles corresponding to a silhouette. Also, when the distance information between the particles is greater than or equal to the threshold, the modeling apparatus detects the silhouette of the target object based on both the depth information and the distance information between the particles. As illustrated in 640, in accordance with one configuration, the threshold is two times greater than a radius of a particle. That is, the threshold is a diameter of a particle.

Since, the distance information between particles is two times greater than the radius of the particle, one particle and another particle at least contact each other or are separate from each other. Also, the distance between the adjacent particles may be interpreted as a difference in the depth information between the adjacent particles in the depth map as illustrated in 630.

The modeling apparatus detects the silhouette 635 based on the depth information and the distance information between the particles obtained from an area in which the particles contact each other or are separate from each other. For example, an area in which the particles have a difference in the depth information to a certain extent.

The modeling apparatus detects the silhouette of the target device by using the depth information, and by additionally using the distance information on the distance between the particles.

Figure 7:
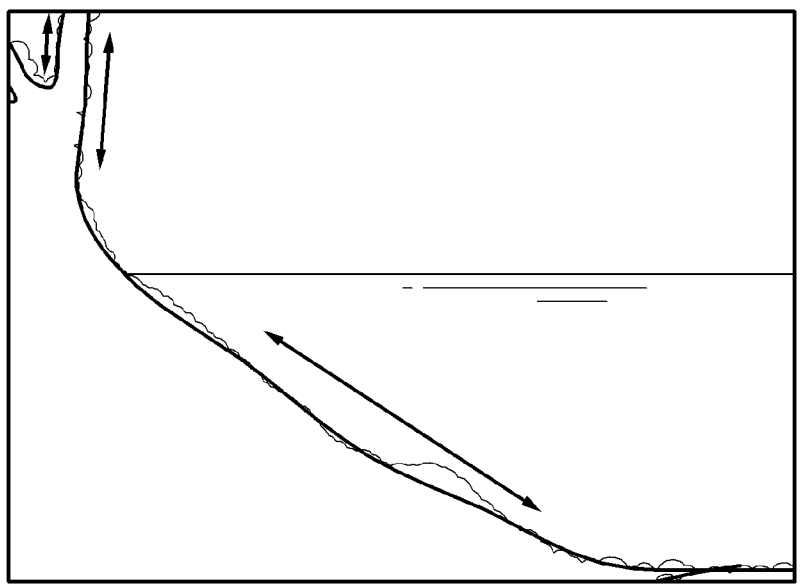
FIG. 7 illustrates an example of a smoothed depth map in a method of modeling a target object according to example embodiments.

FIG. 7 illustrates an example of a smoothed depth map in a method of modeling a target object according to example embodiments.

FIG. 7 illustrates a result of performing smoothing on an area 530 of FIG. 5.

In accordance with one configuration, a modeling apparatus performs smoothing on an adjacent area including a silhouette in an image. The modeling apparatus performs smoothing on the adjacent area including the silhouette based on various smoothing technologies used in a general image processing field. For example, the smoothing technologies include a bilateral filtered smoothing algorithm using a bilateral filter, a naively smoothing algorithm, and a Laplacian smoothing algorithm.

Figure 8:
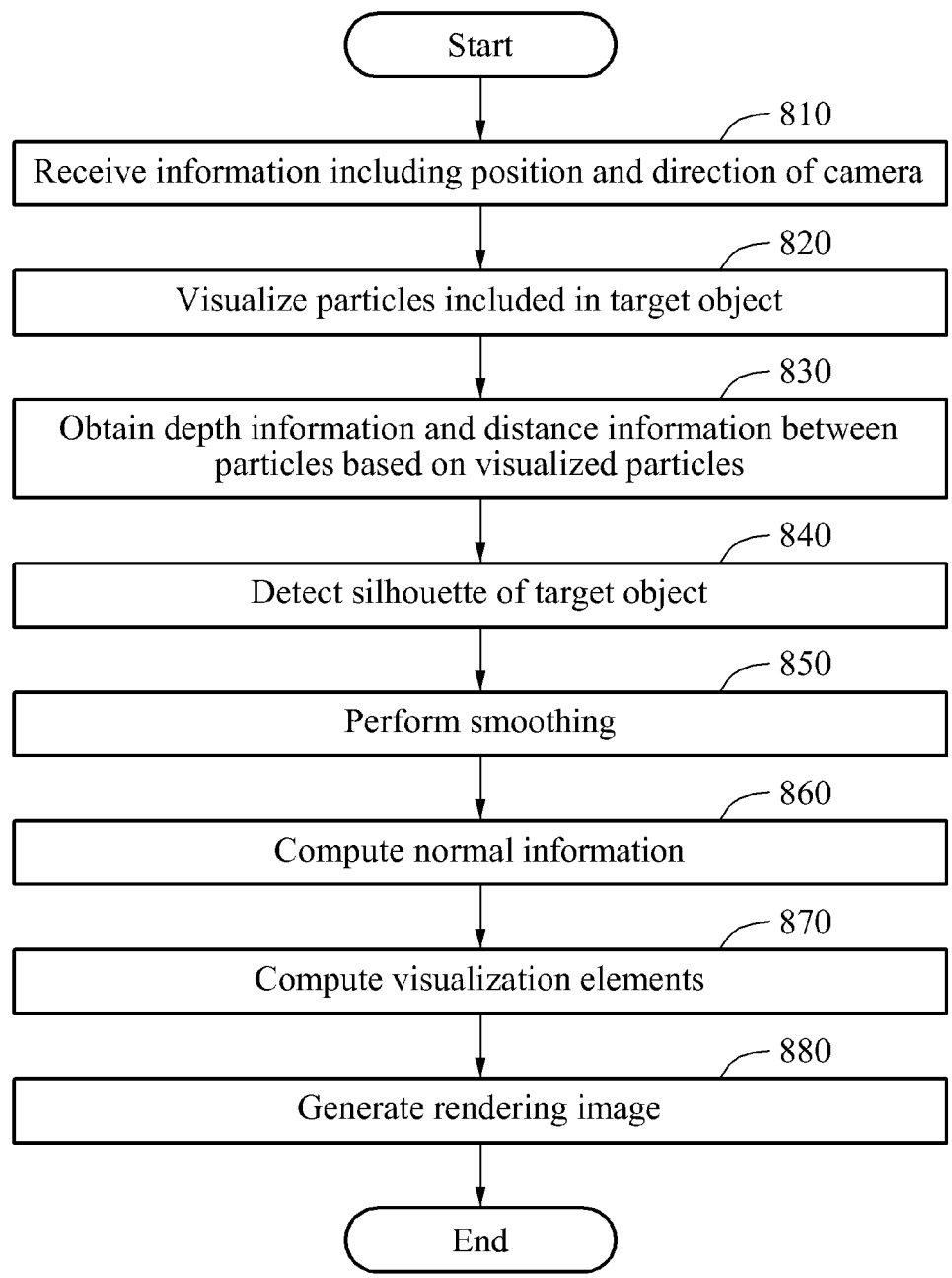
FIG. 8 is a flowchart illustrating an example of a method of generating a rendering image in a method of modeling a target object according to example embodiments.

FIG. 8 illustrates an example of a method of generating a rendering image in a method of modeling a target object according to example embodiments.

Referring to FIG. 8, in operation 810, a modeling apparatus according to example embodiments receives information required for obtaining depth information. For example, the information includes a position of a camera which photographs a target object, a direction of the camera, and a field of view of a scene captured by the camera.

In operation 820, the modeling apparatus visualizes particles, included in the target object.

In operation 830, the modeling apparatus obtains the depth information and distance information between the particles based on the visualized particles.

In operation 840, the modeling apparatus detects a silhouette of the target object based on the depth information and the distance information between the particles obtained from operation 830.

In operation 850, the modeling apparatus performs smoothing on an adjacent area including the silhouette. Here, the modeling apparatus performs smoothing by filtering an area including the silhouette based on a depth map, for example, the depth information. In accordance with one configuration, the modeling apparatus uses, for example, a bilateral filter for the filtering. The smoothing is divided into global area smoothing and silhouette smoothing. For example, the global area smoothing smoothly represents a surface of water and the silhouette smoothing smoothly represents a boundary. The modeling apparatus uses the global area smoothing and the silhouette smoothing selectively or concurrently.

The surface and the ridge in the depth map is evenly represented through smoothing instead of being represented in a spherical shape that is a shape of a particle. The boundary line by the smoothing may be distinctly, blurrily, or smoothly represented based on a filter used by the modeling apparatus. For example, when the modeling apparatus uses the bilateral filter, the boundary line is distinctly represented. When the modeling apparatus uses a Gaussian filter, the boundary line is blurrily or smoothly represented.

The modeling apparatus selectively performs smoothing on an area present within a distance from the silhouette, for smoothly representing the silhouette.

In operation 860, the modeling apparatus computes normal information using a depth information value filtered in operation 850. For example, the normal information is a normal map in which shadowing is represented in detail using a texture, thereby improving a computing efficiency.

In operation 870, the modeling apparatus computes visualization elements. The modeling apparatus computes the visualization elements, for example, a reflection, a refraction, a shadow, and a transparency of the target object, based on the normal information computed in operation 860 and the depth information filtered in operation 850.

In operation 880, the modeling apparatus generates a final rendering image by combining the visualization elements computed in operation 870.

Figure 9:
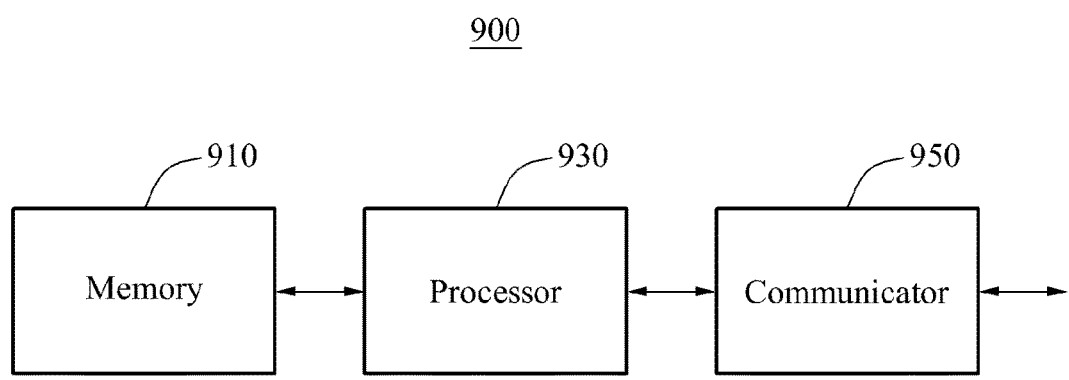
FIG. 9 is a block diagram illustrating an example of an apparatus for modeling a target object according to example embodiments.

FIG. 9 is a block diagram illustrating an example of an apparatus for modeling a target object according to example embodiments.

FIG. 9 illustrates an example of an apparatus (hereinafter, a modeling apparatus) 900 for modeling a target object according to example embodiments.

Referring to FIG. 9, the modeling apparatus 900 includes a memory 910 a processor 930, and a communicator 950. Although FIG. 9 illustrates the memory 910, the processor 930 and the communicator 950 included in the modeling apparatus 900, these components may be embodied as independent hardware. Therefore, the modeling apparatus 900 illustrated in FIG. 9 is not limited thereto and thus may include more or less components.

The memory 910 records a program to control an operation of the modeling apparatus 900 but is not limited thereto. That is the memory 910 may store additional information not directly related to controlling the operation of the modeling apparatus 900, such as apparatus information.

The processor 930 executes a program stored in the memory 910. One processor 930 or a plurality of processors 930 may be used.

The program obtains depth information from an image in which the target object is represented in a form of particles, and distance information between the particles in the image. The program detects a silhouette of the target object based on the depth information and the distance information between the particles.

The program determines whether the distance information between the particles is greater than or equal to a threshold. When the distance information between the particles is determined to be less than the threshold, the program detects the silhouette of the target object based on the depth information. When the distance information between the particles is determined to be greater than or equal to the threshold, the program detects the silhouette of the target object based on the depth information and the distance information between the particles. Here, the threshold may be two times greater than a radius of a particle.

In one configuration, the program detects the silhouette of the target object based on the depth information, and corrects the detected silhouette based on the distance information.

The program defines a target area used to obtain the distance information on the distance between the particles in the image, based on the depth information, and obtains distance information between adjacent particles included in the target area.

The program defines the target area based on a difference in the depth information between the adjacent particles.

The program performs smoothing on an adjacent area including the silhouette in the image.

In one configuration, the communicator 950 receives information required for obtaining depth information. For example, the communication 950 receives a position of a camera which photographs the target object, a direction of the camera, and a field of view of a scene captured by the camera.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of modeling a target object from an image captured by an image sensor, the method comprising:
   obtaining, by a processor, depth information from the image in which the target object is represented in a form of particles;
   obtaining, by the processor, distance information indicating a distance between adjacent particles in the image;
   detecting, by a processor, a silhouette of the target object based on the depth information without using the distance information, in response to a determination that the distance information is less than a threshold;
   detecting, by the processor, the silhouette of the target object based on the depth information and the distance information, in response to a determination that the distance information is greater than or equal to the threshold; and
   performing, by the processor, smoothing on an adjacent area comprising the silhouette of the target object in the image, in response to the determination that the distance information is greater than or equal to the threshold.

2. The method of claim 1, wherein the detecting of the silhouette comprises:
   correcting the detected silhouette based on the distance information.

3. The method of claim 1, wherein the obtaining of the distance information comprises:
   defining a target area used to obtain the distance information based on the depth information, wherein the adjacent particles are included in the target area.

4. The method of claim 3, wherein the defining of the target area comprises defining the target area based on a difference in the depth information between the adjacent particles in the image.

5. The method of claim 4, wherein the difference in the depth information between the adjacent particles in the image comprises a difference in brightness between particles.

6. The method of claim 3, wherein the target area is defined based on a brightness difference between the adjacent particles in the image.

7. The method of claim 3, wherein a difference in depth information between sets of adjacent particles in the target area is greater than or equal to 0.5.

8. The method of claim 1, wherein the obtaining of the depth information comprises:
   visualizing the particles in a form of a circle or an oval using sprite (scheme); and
   computing the depth information based on the visualized particles.

9. The method of claim 8, wherein the visualizing of the particles comprises visualizing the particles by computing a movement of the target object.

10. The method of claim 1, wherein the performing of the smoothing on the adjacent area comprises performing smoothing on the adjacent area using a bilateral filter.

11. The method of claim 1, wherein the target object comprises either one of a fluid and a deformable body.

12. A non-transitory computer-readable storage medium storing instructions that are processor executable to implement the method of claim 1.

13. The method of claim 1, wherein the depth information comprises a position of the image sensor and an observance direction of the image sensor.

14. The method of claim 1, wherein the obtaining of the depth information comprises computing normal information using a normal map to represent shadowing with a texture.

15. The method of claim 1, further comprising displaying a graphic comprising a rendering of the silhouette.

16. A method of modeling a target object from an image captured by an image sensor, the method comprising:
   obtaining, by a processor, depth information from the image in which the target object is represented in a form of particles;
   obtaining, by the processor, distance information indicating a distance between adjacent particles in the image;
   detecting, by the processor, a silhouette of the target object based on the depth information without using the distance information, in response to a determination that the distance information is less than a threshold;
   detecting, by the processor, the silhouette of the target object based on the depth information and the distance information, in response to a determination that the distance information is greater than or equal to the threshold; and
   performing, by the processor, smoothing on an adjacent area comprising the silhouette of the target object in the image, in response to the determination that the distance information is greater than or equal to the threshold,
   wherein the threshold is two times greater than a radius of a particle among the particles.

17. An apparatus to model a target object from an image, the apparatus comprising:
   a processor configured to execute instructions stored in a memory to
      obtain depth information from the image in which the target object is represented in a form of particles,
      obtain distance information indicating a distance between adjacent particles in the image, detect a silhouette of the target object based on the depth information without using the distance information, in response to a determination that the distance information is less than a threshold, detect the silhouette of the target object based on the depth information and the distance information, in response to a determination that the distance information is greater than or equal to the threshold, and perform smoothing on an adjacent area comprising the silhouette of the target object in the image, in response to the determination that the distance information is greater than or equal to the threshold.

18. The apparatus of claim 17, wherein the processor is further configured to correct the detected silhouette based on the distance information.

19. The apparatus of claim 17, wherein the threshold is two times greater than a radius of a particle among the particles.

20. The apparatus of claim 17, wherein the processor is further configured to define a target area used to obtain the distance information from the image, based on the depth information, wherein the adjacent particles are included in the target area.

21. The apparatus of claim 20, wherein the processor is further configured to define the target area based on a difference in the depth information between the adjacent particles in the image.

22. The apparatus of claim 17, wherein the apparatus further comprises the memory, and the memory is a non-transitory computer-readable storage medium.

23. The apparatus of claim 17, further comprising a display configured to display a graphic comprising a rendering of the silhouette.

24. The apparatus of claim 17, further comprising a communicator configured to receive a position of a camera which photographs the target object, a direction of the camera, and a field of view of a scene captured by the camera which is used to obtain the depth information.

* * * * *